Patented July 28, 1953

2,647,106

UNITED STATES PATENT OFFICE 2,647,106

ALKOXYPENTADIENOATE POLYMER COMPOSITIONS

Vaughn A. Engelhardt, Wilmington, Del., assignor to E. I. du Pont de Nemours & Company, Wilmington, Del., a corporation of Delaware No Drawing. Application March 20, 1950, Serial No. 150,813

8 Claims. (Cl. 260—78.3)

This invention relates to a new class of polymerizable organic compounds and to the polymers and copolymers obtainable therefrom.

Vinylacetylene ($CH_2=CHC\equiv CH$) has been used as an intermediate in the preparation of a number of polymerizable compounds. Thus, on reaction with hydrogen chloride under suitable conditions, vinylacetylene yields chloroprene ($CH_2=CClCH=CH_2$) from which the synthetic rubber, neoprene, is obtained on polymerization. On reaction with acetic acid, vinylacetylene yields 1,3-butadienyl-2-acetate

($CH=C(OCOCH_3)CH=CH_2$)

which can likewise be converted into a rubber-like polymer.

This invention has as an object the preparation of new ether esters. Another object is the preparation of new polymerizable monomers. A further object is the preparation of new polymers. Other objects will appear hereinafter.

These objects are accomplished by the present invention wherein vinylacetylene $$CH_2=CH-C\equiv CH$$

is reacted with the carbonate of hydrocarbon alcohol, ROH, wherein R is a monovalent hydrocarbon radical with its free valence stemming from carbon of aliphatic character, i. e., from non-aromatic carbon, in the presence of an alkaline catalyst to form new polymerizable ether esters of the formula

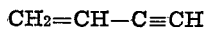

$$CH_2=CHC(OR)=CHCOOR$$

wherein the R's are ordinarily the same and are monovalent hydrocarbon radicals with their free valence stemming from carbon of aliphatic character. These compounds are esters of 2,4-pentadienoic acids having an ether substituent on the third carbon atom. Thus the product in which R is ethyl is ethyl 3-ethoxy-2,4-pentadienoate.

The following examples in which parts are by weight are illustrative of the invention.

EXAMPLE I

Fifty-one (51) parts of vinylacetylene was added portionwise during the course of 2.5 hours to a well-stirred mixture of approximately 360 parts of ethyl carbonate and 26 parts of sodium ethoxide maintained at 80° C. in a reactor provided with a reflux condenser. After all the vinylacetylene had been added, the mixture was kept at 70–80° C. for an additional 7.5 hours. The reaction mixture was then cooled and neutralized with 114 parts of aqueous 21% acetic acid. The aqueous layer was separated from the organic layer, extracted with ether, and the extracts added to the organic layer. The organic layer was dried over magnesium sulfate and subjected to distillation under reduced pressure in the presence of 0.1 part of hydroquinone. The principal fractions obtained were as follows:

| | Parts |
|---|---|
| (a) 39° C./23 mm. | 246 |
| (b) 92–116° C./2.3 mm. | 35.5 |
| (c) 73–76° C./0.2 mm. | 29.6 |

Fraction (a) consisted of unreacted ethyl carbonate, fraction (b) of a mixture of ethyl 3-ethoxy-2,4-pentadienoate and its alcohol addition product, $C_{11}H_{20}O_4$ (ethyl 3,5-diethoxy-2-pentenoate), and fraction (c) of the pure alcohol addition product ($n_D^{25}$ 1.4509).

Analysis

Calculated for $C_{11}H_{20}O_4$: C, 61.08%; H, 9.32%; saponification equivalent, 216.

Found: C, 60.98%; H, 9.61%; saponification equivalent, 217.3, 218.2.

Fraction (b) was added to a mixture of 80 parts toluene, 0.1 part of hydroquinone, and 0.2 part of sodium bisulfate. On heating the mixture, alcohol and toluene distilled at 75–110° C. under atmospheric pressure. The residual oil was then quickly distilled under 3 mm. pressure. This distillate was redistilled through a small packed column to give 26.2 parts of ethyl 3-ethoxy-2,4-pentadienoate, B. P. 79–80.5° C./2.8 mm., $n_D^{25}$ 1.4819.

Analysis

Calculated for $C_9H_{14}O_3$: C, 63.51%; H, 8.29%; saponification equivalent, 170.

Found: C, 63.26%; H, 8.47%; saponification equivalent, 169.5, 168.4.

On standing at room temperature, ethyl 3-ethoxy-2,4- pentadienoate polymerized to a clear, colorless gel. It was found that polymerization of the pentadienoate could be prevented either by adding a few crystals of hydroquinone or by storage in Dry Ice.

EXAMPLE II

Twenty-six (26) parts of vinylacetylene was added during the course of three hours to an agitated mixture of 156 parts of dimethyl carbonate and 11 parts of sodium methoxide maintained at 70–73° C. under an oxygen-free vinylacetylene pressure of 3 to 5 lb./in.² above atmospheric. The reaction mixture was cooled to 15° C. and neutralized with the calculated amount of 20% acetic acid. The aqueous layer was separated from the organic layer, washed with about 40 parts of ether, and the ether extract was added to the organic layer. The organic layer was dried over magnesium sulfate containing hydroquinone, and was then distilled. After removal of the ether and unreacted dimethyl carbonate (105 parts), a fraction (23.4 parts) boiling at 70–120° C./15–25 mm. was obtained. This fraction was mixed with 0.1 part hydroquinone, 0.4 part sodium bisulfate, and about 70 parts toluene. This mixture was distilled at atmospheric pressure until most of the toluene and lower boiling material had been removed, and was then distilled under reduced pressure. The distillate, which consisted of 8.7 parts of colorless liquid boiling at 91–93° C./20.5 mm., was methyl 3-methoxy-2,4-pentadienoate. On redistillation over hydroquinone, the product boiled at 89–89.5° C./19 mm. and had a refractive index $(n_D^{25})$ of 1.4949.

*Analysis*

Calculated for $C_7H_{10}O_3$: C, 59.15%; H, 7.04%; mol. wt., 142.
Found: C, 59.05%, 58.97%; H, 7.37%, 7.33%; mol. wt., 130, 142, 153.

On standing the product polymerizes to a colorless resin.

EXAMPLE III

Ten parts of ethyl 3-ethoxy-2,4-pentadienoate and 0.2 part of alpha,alpha'-azobis-isobutyronitrile were dissolved in 20 parts of dry benzene and refluxed for 21 hours. When solvent was removed at 60° C./0.3 mm., 10 parts of a brittle colorless polymer were obtained. The polymer softened and melted at 70–120° C., and on cooling, formed a clear but brittle film.

EXAMPLE IV

Example III was repeated except that 0.2 part of benzoyl peroxide was used as initiator in place of the azonitrile. A quantitative yield of a colorless, taffy-like polymer was obtained. This material slowly assumed the shape of the container in which it was placed.

EXAMPLE V

An emulsion polymerization was carried out by mixing 10 parts of ethyl 3-ethoxy-2,4-pentadienoate with 30 parts of water, 0.2 part of potassium persulfate, and 0.05 part of sodium bisulfite, 0.05 part of the sodium salt of sulfated "Lorol" ($C_{10}$–$C_{18}$ alcohols), and 0.5 part of disodium phosphate. The mixture was heated at 50° C. for 10 hours in a pressure bottle mounted in a tumbler shaker. The emulsion was then coagulated by the addition of alcohol and the solid polymer was collected by filtration. The polymer was washed successively with water and alcohol, and dried at 60° under 0.5 mm. pressure. Nine parts of polymer was thus obtained. The material melted at 90–125° C. and, on cooling, formed a hard, brittle film. A 10% solution of the polymer in benzene was fairly viscous. Determinations of the inherent viscosity of the polymer in 0.1% benzene solution at 25° C. gave a value of 1.70 and a relative viscosity of 1.185.

Five parts of polymeric ethyl 3-ethoxy-2,4-pentadienoate was refluxed with 32 parts of methanol containing 2.8 parts of hydrochloric acid for five minutes. After neutralization with ammonium hydroxide the solid product was collected and then dissolved in 40 parts of boiling methanol. Three parts of cupric acetate dissolved in the minimum amount of boiling water was added with shaking. The copper enolate of polymeric ethyl 3-keto-4-pentenoate precipitated as a pale green solid which decomposed at 258° C.

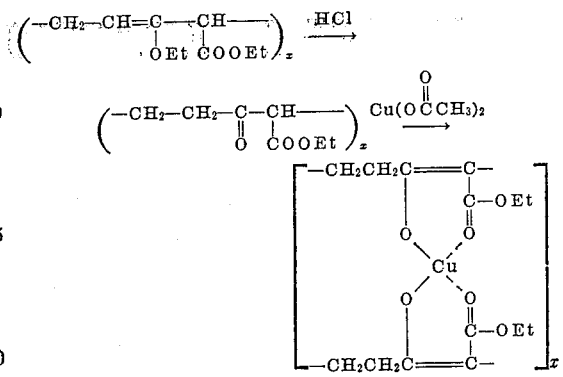

EXAMPLE VI

A solution containing 40.0 parts chloroprene, 10.0 parts ethyl 3-ethoxy-2,4-pentadienoate, 2.0 parts Nancy wood rosin, and 0.17 part dodecyl mercaptan was emulsified at room temperature in a solution containing 78.5 parts water, 0.475 part sodium hydroxide, 0.30 part "Daxad" 11 (formaldehyde/sodium naphthalene sulfonate condensation product) and 0.30 part potassium persulfate. The emulsion was stirred slowly and heated under a blanket of nitrogen to a temperature of 40° C. After eight minutes at this temperature polymerization started as evidenced by a rise in the temperature of the emulsion. The polymerization was run for 1.2 hours at 40–43° C. During this time the specific gravity of the polymer latex rose from 0.98 to 1.050. The polymerization was stopped at this point by addition of 7.5 parts of an emulsion prepared by emulsifying a solution containing 0.4 part phenothiazine, 0.4 part p-tertiary butyl catechol, and 70.4 parts benzene in a solution containing 126 parts water, 1.2 parts sodium "Lorol" sulfate, and 0.6 part "Daxad" 11.

Coagulation of 21 parts of the polymer latex in 158 parts ethanol gave 4.7 parts of a colorless, elastic product. Analyses indicated that the product contained 35.8% chlorine which corresponds to a copolymer containing 5–6 mole per cent ethyl 3-ethoxy-2,4-pentadienoate. The copolymer was soluble in benzene and chloroform.

The chloroprene/ethyl 3-ethoxy-2,4-pentadienoate copolymer was more resistant toward heat and light than polychloroprene. Thus rayon fabric impregnated with the copolymer latex and heated for one hour at 125° C. was only slightly discolored and tendered, whereas rayon fabric treated with a polychloroprene latex became brown and noticeably tendered under these conditions. (The degree of tendering of the rayon is a measure of the amount of HCl evolved when the polymers are heated and thus gives a qualitative indication of the stability of the polymer toward heat.)

Rayon fabrics impregnated with the copolymer latex were also less discolored and less tendered after exposure to ultraviolet light than rayon fabrics impregnated with a polychloroprene latex.

EXAMPLE VII

An aqueous mixture containing 40.0 parts butadiene, 10.0 parts ethyl 3-ethoxy-2,4-pentadienoate, 75.0 parts water, 0.65 part sodium hydroxide, 2.0 parts oleic acid, 0.5 part "Daxad" 11, 0.5 part potassium persulfate, 0.075 part potassium ferricyanide, 1.0 part Nancy wood rosin, and 0.17 part dodecyl mercaptan was prepared and heated in a closed vessel for 16 hours at 40° C. A stable emulsion was obtained to which was added 6.5 parts of the emulsion containing phenothiazine and p-tertiary butyl catechol described in Example VI. The polymer was isolated by pouring the emulsion into 552 parts ethanol. A gumlike product was obtained which was washed with water and ethanol and dried. There was thus obtained 30.0 parts of ethyl 3-ethoxy-2,4-pentadienoate/butadiene copolymer. Analyses indicated that the product contained 81.55% carbon and 10.50% hydrogen which corresponds to a copolymer containing 7-8 mole per cent ethyl 3-ethoxy-2,4-pentadienoate. This copolymer was soluble in chloroform but insoluble in benzene. It was a colorless, tack-free solid which exhibited elastic properties.

EXAMPLE VIII

A solution containing 4.3 parts chloroprene, 1.8 parts ethyl 3-ethoxy-2,4-pentadienoate, and 0.05 part alpha, alpha'-azobis(alpha,gamma-dimethylvaleronitrile) as polymerization initiator was heated under nitrogen at atmospheric pressure for 20 hours at 48-52° C. A soft, elastic ethyl 3-ethoxy-2,4-pentadienoate/chloroprene copolymer was obtained which was washed thoroughly with methanol and dried. Analyses indicated that the product (4.8 parts) contained 29.75% chlorine which corresponds to a copolymer containing 16-17 mole per cent ethyl 3-ethoxy-2,4-pentadienoate. The product was insoluble in benzene and chloroform.

EXAMPLE IX

A mixture of 10 parts ethyl 3-ethoxy-2,4-pentadienoate, 10 parts acrylonitrile, 44 parts benzene, and 0.2 part alpha, alpha'-azobisisobutyronitrile was refluxed for 5.5 hours. The polymer solution was diluted with 22 additional parts of benzene, and was then poured into about 300 parts of petroleum ether. This caused 18.4 parts of a copolymer of ethyl 3-ethoxy-2,4-pentadienoate and acrylonitrile to separate. The polymer softened in the range 125 to 135° C., and was soluble in benzene, dimethylformamide, hot xylene, and in a 1:1 mixture of warm benzene and chloroform. The polymer was readily pressed into clear films at 160° C. Analysis showed that the copolymer contained approximately 65.2% carbon and 7.2% hydrogen, which indicated the presence of about equal parts by weight of ethyl 3-ethoxy-2,4-pentadienoate and acrylonitrile.

In the preparation of the 3-ether substituted 2,4-pentadienoic acid esters of this invention any carbonic ester of formula $(RO)_2C=O$, in which R is a monovalent hydrocarbon radical with the free valence stemming from carbon of aliphatic character may be used. Additional examples of such carbonates are propyl, butyl, cyclohexyl, n-decyl, and benzyl carbonates. The preferred carbonates are alkyl carbonates in which the alkyl group contains from one to four carbons.

The ratio of the carbonate to monovinylacetylene can be varied widely but, for best results, it is desirable to use at least one mole of the carbonate for each mole of vinylacetylene. The pressure at which the reaction is carried out is not critical but to prevent loss of vinylacetylene and to insure safety of operation it is preferred to operate at moderately low pressures, e. g., one to five atmospheres. The reaction is conveniently carried out at 20 to 150° C. and generally at 30 to 90° C. Temperatures outside these ranges can be used, however. As already indicated alkaline catalysts are used, preferably alkali alkoxides, such as sodium methoxide, sodium butoxide and the corresponding potassium compounds. Other catalysts which can be used are sodium monovinylacetylide, sodium hydride, triphenylmethyl sodium, sodium amide and quaternary ammonium alkoxides, such as benzyltrimethylammonium ethoxide.

As indicated in Example I, the reaction of the carbonate with vinylacetylene yields, in addition to the alkyl 3-alkoxy-2,4-pentadienoate, an alcohol addition product of the pentadienoate. This product, which is an alkyl-3,5-dialkoxy-2-pentenoate, loses alcohol on heating with mildly acidic agents, such as sodium bisulfate, to form the corresponding alkyl 3-alkoxy-2,4-pentadienoate.

The substituted 2,4-pentadienoic esters of this invention are for the most part liquids at ordinary temperatures, and are soluble in ether, ethanol, ethyl acetate, and acetone. They are readily susceptible to polymerization and for this reason are best stored at low temperatures or admixed with polymerization inhibitors. They also react with bromine and with aqueous potassium permanganate.

The 2,4-pentadienoates can be polymerized by the methods known for the polymerization of vinyl compounds. Suitable polymerization initiators are organic peroxides, e. g., diethyl peroxide; persulfates, e. g., sodium and ammonium persulfate; and the azonitriles described in Hunt U. S. 2,471,959. In general, any compound capable of yielding unstable free-radicals can be used as a polymerization initiator. The pentadienoates can be polymerized alone or in admixture with other polymerizable compounds or with compounds susceptible to copolymerization. Examples of such compounds, in addition to those already mentioned, are acrylic and methacrylic esters, e. g., ethyl acrylate and methyl methacrylate; olefins, e. g., ethylene and styrene; vinyl esters, e. g., vinyl chloride, vinyl fluoride, and vinyl acetate; halogenated ethylenes, e. g., vinylidene chloride; fluorinated ethylenes, e. g., chlorotrifluoroethylene and tetrafluoroethylene; maleic and fumaric compounds, e. g., maleic anhydride and diethyl fumarate; unsaturated nitriles, such as acrylonitrile and methacrylonitrile; and other dienes, e. g., fluoroprene, isoprene, butadiene and ethoxyprene. The pentadienoates can be copolymerized with each other or with one or more of the above-mentioned monomers.

As indicated in Example V, the polymeric pentadienoates can be hydrolyzed to give polymers containing β-ketoester or β-ketoacid groups. These hydrolyzed polymers form chelates with metals, e. g., on treatment with metallized dyes.

The polymers (including copolymers) of this invention are useful in making coating and molding compositions. They can also be used as rubber-substitutes. In these and other uses the polymers can be compounded with dyes, pigments, fillers, vulcanizing agents, plasticizers, antioxidants, and other polymers. The hydrolyzed copolymers have enhanced dye receptivity.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A polymer of an ether ester of 3-hydroxy-2,4-pentadienoic acid wherein the hydroxyl and carboxyl hydrogens of the acid are each replaced by a monovalent hydrocarbon radical with its free valence stemming from carbon of aliphatic character.

2. A polymer of an alkyl 3-alkoxy-2,4-pentadienoate.

3. A polymer of ethyl 3-ethoxy-2,4-pentadienoate.

4. A copolymer of an alkyl 3-alkoxy-2,4-pentadienoate, in amount of at least 5 mol per cent, based on the copolymer, with another ethylenically unsaturated compound subject to addition polymerization.

5. A copolymer of an ether ester of 3-hydroxy-2,4-pentadienoic acid wherein the hydroxyl and carboxyl hydrogens of the acid are each replaced by a monovalent hydrocarbon radical with its free valence stemming from carbon of aliphatic character, in amount of at least 5 mol per cent, based on the copolymer, with another ethylenically unsaturated compound subject to addition polymerization.

6. A copolymer of chloroprene with at least 5 mol per cent, based on the copolymer, of ethyl 3-ethoxy-2,4-pentadienoate.

7. A copolymer of chloroprene with at least 5 mol per cent, based on the copolymer, of an alkyl 3-alkoxy-2,4-pentadienoate.

8. A copolymer of chloroprene with at least 5 mol per cent, based on the copolymer, of an ether ester of 3-hydroxy-2,4-pentadienoic acid wherein the hydroxyl and carboxyl hydrogens are each replaced by a monovalent hydrocarbon radical with its free valence stemming from carbon of aliphatic character.

VAUGHN A. ENGELHARDT.

References Cited in the file of this patent

UNITED STATES PATENTS

| Number | Name | Date |
|---|---|---|
| 2,395,812 | Gudgeon et al. | Mar. 5, 1946 |
| 2,560,277 | Croxall et al. | July 10, 1951 |

FOREIGN PATENTS

| Number | Country | Date |
|---|---|---|
| 570,358 | Great Britain | July 4, 1945 |